United States Patent Office 3,708,598
Patented Jan. 2, 1973

3,708,598
SUBSTITUTED 2,4 - (ω-AMINOALKOXY) PHENYL IMIDAZOLES AS CHOLESTEROL REDUCING AGENTS
Rudolf G. Griot, Florham Park, N.J., assignor to Sandoz, Inc., Hanover, N.J.
No Drawing. Original application Apr. 29, 1968, Ser. No. 725,179. Divided and this application July 10, 1970, Ser. No. 61,026
Int. Cl. A61k 23/00
U.S. Cl. 424—273
4 Claims

ABSTRACT OF THE DISCLOSURE

This invention relates to 4,5-dicyclosubstituted-2-[4-(ω-aminoalkoxy)phenyl]imidazoles useful as hypolipidemics, and to preparation of said compounds.

---

This application is a division of Ser. No. 725,179, filed Apr. 29, 1968, now abandoned.

This invention relates to 4,5-dicyclosubstituted-2-[4-(ω-aminoalkoxyphenyl]imidazoles, and to method of preparation of said compounds.

More particularly, the imidazoles of the present invention are represented by the formula:

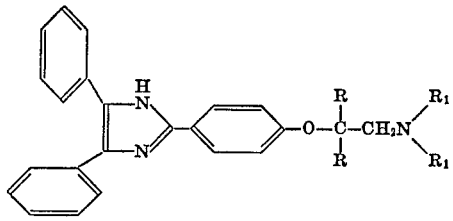

(I)

wherein each of R is, independently, hydrogen or lower alkyl, i.e., of no more than 4 carbon atoms, each of $R_1$ is, independently, lower alkyl or taken together an alkylene bridge of 4 or 5 carbon atoms, i.e., N-pyrrolidyl or N-piperidyl, and pharmaceutically acceptable acid addition salts thereof.

The compounds I of the present invention are preferably produced by reaction of an ω-aminoalkoxy derivative of benzaldehyde with benzil and ammonium acetate in acetic acid, as illustrated below, wherein R and $R_1$ have the above-defined meaning:

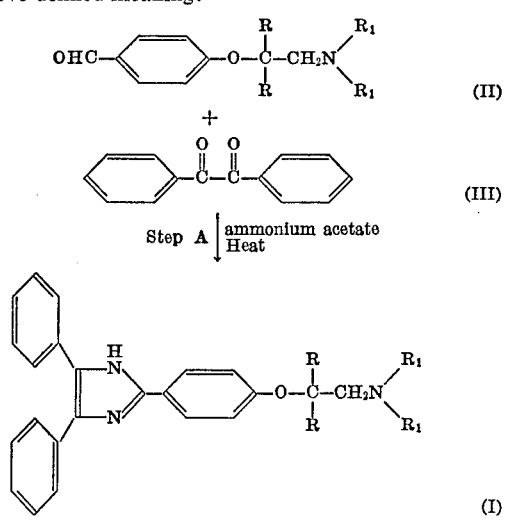

The production of compounds I by Step A involving reaction of compound II with benzil and ammonium acetate is effected conveniently at elevated temperatures, typically between 60° C. to 120° C., preferably at reflux temperatures. The reaction of Step A is desirably carried out in acetic acid as a solvent which also serves as buffering or reaction control medium. Time for reaction may vary depending largely on reaction temperature between ½ to 10 hours, and is usually 1 to 3 under the more preferred conditions of operation. Compounds I are conveniently recovered in the form of an acid addition salt, preferably the hydrochloride, and, if desired, may be converted to the free base by conventional procedures. The reaction of Step A may be carried out similarly to analogous reactions already described in the literature, for example, Chem. Abstracts 63, 1993(c).

Compounds II employed as starting material in Step A are known or can be readily prepared from known materials by established procedures, preferably by reaction of p-hydroxybenzaldehyde with the alpha halo derivative of or forming the omega-aminoalkoxy moiety, as illustrated below, as follows:

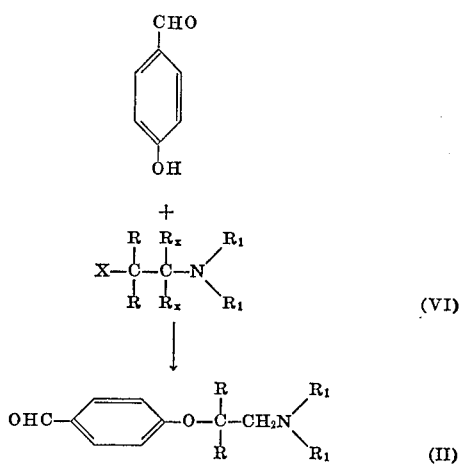

wherein R and $R_1$ have the above-defined meaning, X is halogen of atomic weight of from 35 to 127, i.e., chloro, bromo, or iodo, and $R_x$ in compound IV are both hydrogen or lower alkyl but when lower alkyl both R's are hydrogen. It will be noted that $R_x$ can be lower alkyl, i.e., the lower alkyl substituent is on the omega carbon atom, because such compounds IV are capable of undergoing rearrangement on reaction with p-hydroxyphenyl compounds to form compounds such as compounds II in which the alpha carbon substituent is lower alkyl, as described by J. E. Kerwin et al., J.A.C.S. 69, 2961 (1947). Preparation of compounds II involving reaction of p-hydroxybenzaldehyde and compounds of Formula IV generally is well known and described in the literature, for example, British Pat. 377,464 and Chemical Abstracts 1933, 4031. Compounds IV are either known or can be readily prepared from known materials by established procedures.

Also within the scope of the present invention are pharmaceutically acceptable salts not materially affecting the pharmacological effect of the compounds of Formula I. Such salts include the acid addition salts, e.g., the hydrochloride, fumarate, formate, acetate, citrate, sulfonate, malenate, tartrate, methane sulfonate, salicylate and hydrosulfate. The acid addition salts may be produced as desired from the corresponding free bases by conventional procedures. Conversely, the free bases may be obtained from the salts by procedures known in the art.

The compounds of structural Formula I and their pharmaceutically acceptable acid addition salts are useful because they possess pharmacological activity in animals. In particular, the compounds are useful as hypolipidemic agents, as evidenced, for example, by having hypocholesteremic activity, as indicated by tests on a group of white rats which are given 10–50 milligrams per kilogram of body weight per diem of the compound orally, for 6 days, followed by extraction with isopropanol of serum or plasma after anesthetizing the rats with sodium hexobarbital, and then noting the cholesterol content as compared to those of a control group. The cholesterol content is determined by the method described by Lofland, H. B., Anal. Biochem. 9:393 (1964): (Technicon method N 24a). For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 0.05 gram to about 0.5 gram of the compound, and the dosage forms suitable for internal use comprise from about 12.5 milligrams to about 250 milligrams of active compound in intimate admixture with a solid or liquid pharmaceutically acceptable carrier or diluent.

For the above usage, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredients: | Weight (mg.) |
|---|---|
| 2 - [4 - (2 - diethylaminoethoxy)phenyl]-4,5-diphenyl imidazole dihydrochloride | 50 |
| Tragacanth | 10 |
| Lactose | 197.5 |
| Corn starch | 25 |
| Talcum | 15 |
| Magnesium stearate | 2.5 |

The following example shows a representative compound encompassed within the scope of this invention and the manner in which such compound is prepared. However, it is to be understood that the example is for purpose of illustration only and is not intended as in any way limiting the scope of the invention which is defined in the appended claims.

EXAMPLE 1

2-[4-(2-diethylaminoethoxy)phenyl]-4,5-diphenyl imidazole dihydrochloride

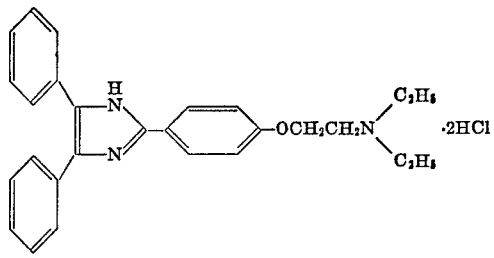

A mixture of 21 g. benzil, 22.1 g. p-[β-diethylamino) ehtoxy]-benzaldehyde, and 60 g. ammonium acetate in 524 g. glacial acetic acid is refluxed for 2 hours. The resulting mixture is concentrated in vacuo and the residue taken up in 200 ml. water which is made alkaline (pH 8–9) by addition of ammonium hydroxide. The resulting emulsion is extracted three times each with 300 ml. ether followed by two treatments each with 56 ml. saturated sodium chloride solution. After drying over anhydrous magnesium sulfate and filtering an excess of hydrogen chloride saturated ether is added to obtain a white solid which is triturated with ether. The mixture is filtered and the solid dissolved in a minimum of refluxing isopropanol, treated with charcoal, filtered, and the filtrate treated by adding a few drops of concentrated hydrochloric acid to obtain a white solid which on recrystallization from boiling isopropanol gives a white crystalline solid of 2-[4-(2-diethylaminoethoxy)phenyl]-4,5-diphenyl imidazole dihydrochloride, M.P. 262–264° C.

What is claimed is:

1. A method for reducing the cholesterol content in the blood of a mammal comprising orally administering to a mammal in need of said treatment a cholesterol reducing effective amount of a compound of the formula:

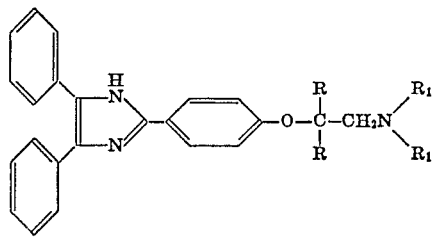

wherein
each of R is independently hydrogen or lower alkyl, and
each of $R_1$ is independently lower alkyl or taken together form an alkylene bridge of 4 or 5 carbon atoms,
or a pharmaceutically acceptable acid addition salt thereof.

2. The method of claim 1 in which the compound administered is a compound in which each R is hydrogen and each $R_1$ is lower alkyl.

3. The method of claim 2 in which the compound administered is 2-[4-(2-diethylaminoethoxy)phenyl]-4,5-diphenyl imidazole.

4. The method of claim 1 in which administration is at a daily dosage in the range of from 4 to 30 milligrams per kilogram of body weight.

References Cited

UNITED STATES PATENTS 3,558,645   1/1971   Griot _____ 424—273

OTHER REFERENCES

Bhaduri et al., Indian Jour. Chem., vol. 4, pp. 419-20 (1966).

ALBERT T. MEYERS, Primary Examiner

V. D. TURNER, Assistant Examiner

U.S. Cl. X.R.

260—309; 424—267